Feb. 25, 1969  G. PUDERBACH  3,429,466
MACHINE FOR CONFECTIONERY MANUFACTURE
Filed July 25, 1966  Sheet _1_ of 2
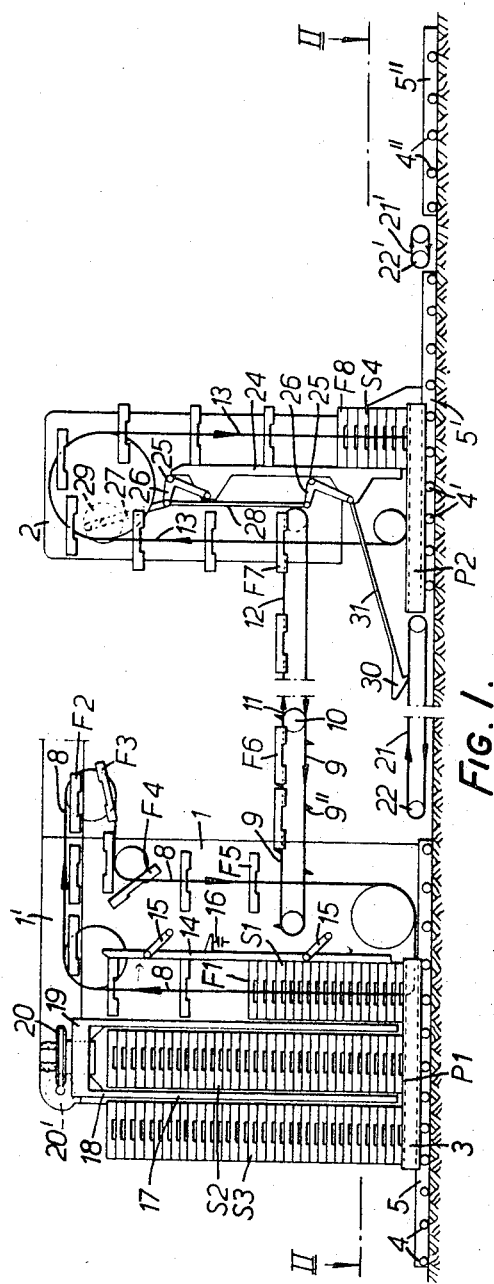
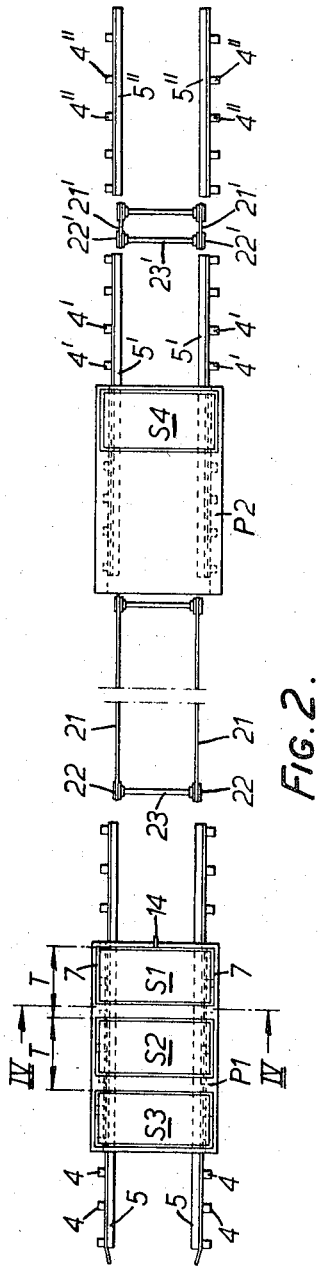
FIG. 1.
FIG. 2.
INVENTOR
G. Puderbach
BY
Richards & Geier
ATTORNEYS 3,429,466
MACHINE FOR CONFECTIONERY MANUFACTURE Gerhard Puderbach, Neuwied, Germany, assignor to Richard Winkler and Dunnebier, doing business as Winkler & Dunnebier, Neuwied (Rhine), Germany, a partnership
Filed July 25, 1966, Ser. No. 567,486
Claims priority, application Germany, July 30, 1965, W 39,643
U.S. Cl. 214—306          6 Claims
Int. Cl. B65b 21/02; B65g 57/00, 59/00

ABSTRACT OF THE DISCLOSURE

A machine for casting confectionery with a powder filling in forms or trays is provided with a roller track extending in the longitudinal direction of the machine at the inlet end thereof, a pallet easily movable upon the track, preferably three or more stacks of forms or trays mounted according to a specific stack pitch upon the pallet when the pallet is full, and an automatic periodically operable device engaging the next stack when the front one has been emptied and pushing the next stack with the pallet into the position previously occupied by the emptied stack. An automatic periodically operated drive is located under the machine for transporting emptied trays to the outlet end of the machine. Another pallet is easily movable upon another roller track extending in the longitudinal direction of the machine at the outlet end thereof. This pallet receives filled trays as stacks and cooperates with an automatic periodically operating device which engages behind the front filled stack and shifts it along with the pallet to the extent of a stack pitch. This device also removes the empty pallet from the drive.

---

This invention relates to a method of container supply and apparatus therefor, particularly for casting confectionery. The method and apparatus of this invention are appropriately employed whenever a plurality of container elements are to be loaded successively into a machine, actuated in some manner by the machine, and subsequently sequentially unloaded therefrom.

Types of machinery wherein the method of this invention and the apparatus thereof can be employed are, for example, various molding devices and in particular confectionery casting machines. These machines utilize a plurality of trays which are initially stacked at the inlet of the machine and are successively introduced into the machine. These trays are automatically conveyed from one station to the next through the machine and are finally automatically assembled at the exit end of the machine into a stack. Molding machines which can be utilized in connection with the method and apparatus of this invention are described in British Patent 674,001.

The method and apparatus of this invention, when utilized in connection with such molding machines, specifically relate to the conveyance of the trays to, into and out of the machine.

When the method and apparatus of this invention are employed in connection with so-called mogul molding machines in which, for example, parts of fondant, jelly, gumdrops, liqueur beans having a sugar crust, etc. are manufactured, the candy involved is poured into starch trays which are filled with starch powder. Since this is the most important application of the instant invention, it will be now described in association with such mogul machine.

Generally, a modern mogul machine lifts starch trays off automatically and successively from a stack. These starch trays are disposed at the inlet end of the machine. They contain previously cast confectioneries, which dried in the meantime, as well as powder. The trays are emptied by being inverted, whereupon the mogul machine fills the trays again with powder, punches mold indentations into the powder, pours liquid confectionery body into the mold indentations and then automatically assemblies the trays thus filled into a stack at the exit end of the machine.

Conventionally, each stack is disposed on a roller truck or other base. While the machine lifts off the trays from the stack at the inlet end, a fresh stack is pushed toward the machine. As soon as the last tray of the old stack is lifted off, the new stack is pushed by hand or automatically into the lift off position, while the empty roller truck or base is correspondingly pushed forward.

Each of the aforementioned stacks consists of approximately 40 to 60 starch trays, disposed on a roller truck or base. Since a mogul molding machine processes an average of approximately 20 trays per minute, a stack of trays must be moved once every two to three minutes from the drying chamber to the inlet end of the machine and a second stack must be moved from the exit end of the machine into the drying chamber. In addition, the empty roller trucks, which are usually drawn laterally below the machine, must be pulled forward and moved to the exit end of the machine to receive the new stacks of trays. Since the drying chamber for the filled trays is not usually closely adjacent to the mogul molding machine, but is often disposed at a distance of 20 m. or more, the conveyance of the tray stacks requires a considerable effort in terms of time and labor.

The conventional method is very disadvantageous. The conveyance of the stacks is a difficult and time consuming operation. Proper structure to perform this task automatically and conveniently has been noticeably lacking. Particularly with the present high cost of labor, the conventional processes have been uniformly unsatisfactory.

An object of the present invention is to eliminate the difficulties in prior art structures and to reduce to a fraction the great losses of time involved in the transportation of the tray stacks.

According to the present invention the method previously used to transport the stacks of trays is replaced by a simple and foolproof structure comprising pallets provided at the inlet end and the outlet end of the machine. These pallets are made so as to be easily movable longitudinally and are used to receive several, preferably three or four, stacks in a specific arrangement. Furthermore, means are provided which automatically move the appropriate pallet by one stack division after all of the trays from one stack are completely removed from the inlet end of the machine. Similar structure is provided to move the appropriate pallet forward at the outlet end of the machine when one stack of trays has been completely filled. Conveying means are also provided which automatically convey the completely empty pallet from the inlet end to the outlet end of the machine.

The number of stacks mounted upon one pallet depends upon transporting means available for the transportation of the pallets outside of the machine. The saving of time increases with an increase of the number of stacks upon one pallet.

The foregoing sets forth a brief description of the instant invention and some of the objects and advantages thereof. Further objects and advantages of this invention will become apparent as the description proceeds.

The invention will be further described by reference to the accompanying drawings that are made a part of this specification.

FIGURE 1 is a side view, in somewhat diagrammatic form, of the preferred form of apparatus utilized to carry out this invention and shows the transportation of the starch trays, the stacks and the pallets at both ends of the machine. The internal structure of the machine itself, which forms no part of this invention, has been omitted.

FIGURE 2 is a sectional view of the structure shown in FIG. 1 taken along line II—II of FIG. 1 and illustrates the transporting means for the tray staples and the pallets, without, however, showing the enclosing portions of the machine itself.

Figure 3:
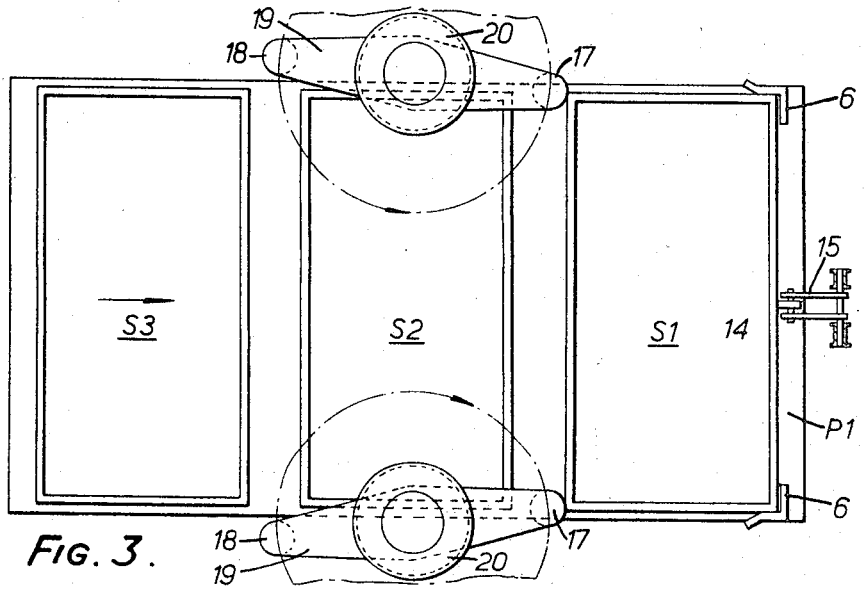
FIGURE 3 is a detail plan view, on an enlarged scale, of the means employed for the introduction of a stack of trays into the machine, without showing the machine itself.

The invention will now be described in detail by reference to the specific form thereof shown in the accompanying drawings. In this connection, however, it should be noted that the specific form of this invention as set forth in this specification is for illustrative purposes and for purposes of example only. Various changes and modifications may obviously be made within the spirit and scope of this invention.

A detailed description of this invention will now be given by reference to the specific form thereof shown in the accompanying drawings.

FIG. 1 shows a mogul molding machine provided with an inlet end 1 and an outlet end 2. The specific details of the machine itself, including the central portion thereof, are not important in connection with the instant invention and, therefore, are not shown. A pallet P1 with three tray stacks S1, S2 and S3 is disposed adjacent the inlet end of the machine. The pallet rests in an easily displaceable manner with its longitudinal webs 3 on rollers 4 of a roller track which may consist of angle irons 5 secured on the workshop floor. The pallet is so disposed in the machine that the front edges of the stack S1 rest against stops 6 fixed to the machine (FIG. 3), these stops being approximately of the length of the stack height. The upper tray F1 of the stack S1 is gripped in a known manner by its sides 7 by conventional alligator or other grippers which are not shown, of which a plurality are secured upon two roller chains designated by the numeral 8 and which are moved in the direction indicated by the arrow in FIG. 1. Each of the trays which has been previously filled with a cast material and molding powder is then conveyed while retaining its horizontal position to the position F2, is then inverted at F3 and its contents discharged onto a trough (not shown), is then inverted once again at F4 and placed at a point below F5 onto a conveyor chain 9 having ribs 9″ with drivers 10 which convey the trays horizontally to the position F6; during this movement they are filled with powder and the mold indentations are stamped. Adjacent the driver 10 the conveyor chains 11 take over the trays by means of drivers and move them through the station for the casting operation. The filled trays after leaving the casting station are finally taken over by the conveyor chains 12 having no grippers and move to the position F7 against a stop, not shown, with a limit switch. The stop triggers the drive of a pair of roller chains 13 which are moved periodically in the direction of the arrow (shown in FIG. 1). Chains 13 have a plurality of grippers (not shown), by means of which each tray striking against the stop is lifted from the position F7, is initially moved upwards in the direction indicated by the arrow by means of the roller chains 13 and while maintaining its horizontal position, and is then moved downwards in a known manner as indicated at F8 so as to be placed upon the stack S4.

A rod 14 is located in the raising section in front of the stops 6. The rod 14 is pivotally mounted on the machine frame by means of the levers 15 and is held in a slightly raised position by the trays. When the last tray of the stack S1 has been lifted from the pallets P1 and has been raised so that it no longer touches the upper end of the rod 14, the levers 15 pivot and cause the rod 14 to slightly drop and close the limit switch 16.

As best shown in FIG. 3, the staple S1 is located between two front stops 6 and two rods 17 located rearwardly relatively to the direction of movement. Each rod 17 along with an opposed rod 18 are firmly mounted upon a double lever 19 which is rotatably mounted in an upper portion 1′ of the inlet section of the machine and which extends freely downwardly close to the pallet P1. A separate worm wheel 20 is firmly connected with each double level 19. The two worm wheels 20 can be turned to the extent of precisely 180° in the direction of the arrow shown in FIG. 3 by worms 20′ (FIG. 1) and a separate electromotor (not shown), as will be described in greater detail hereafter.

Two roller tracks 4′, 5′ and 4″, 5″ are located below and beyond the outlet section 2 of the machine and extend in alignment with the roller track 4, 5 located at the inlet of the machine. A pair of V-belts 21 is located between the roller track 4, 5 and the roller track 4′, 5′. The endless belts 21 are stretched by pulleys 22 carried upon a plurality of shafts 23 and are driven intermittently by a separate electromotor (not shown) in the direction of arrows shown in FIG. 1 in a manner which will be described at length later on. The pulleys 22 are advantageously coupled with the shafts 23 by a free-wheeling device and can be easily rotated against the driving direction.

A considerably shorter pair of V-belts 21′ extends in alignment with the belts 21 between the roller tracks 4, 5 and 4″, 5″, and is stretched by pulleys 22′ carried by shafts 23′. The belts 21′ are also intermittently driven in the direction of the arrows by a separate electromotor (not shown) in a manner which will be described in detail later on.

Figure 4:
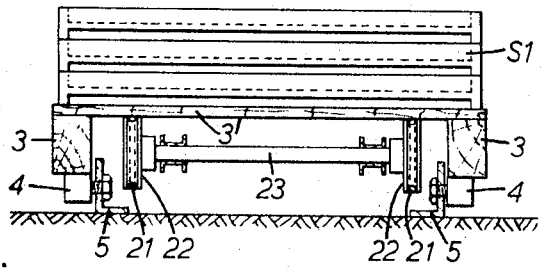
FIGURE 4 is a detail sectional view through a pallet and the conveying means taken along line IV—IV of FIG. 2. This view is also shown on an enlarged scale.

The upper stringers of the belts 21, 21′ are located so high in relation to the roller tracks that the under surface 3′ of the platform of the pallet (FIG. 4) lies so firmly upon the belts that a pallet reaching a running belt from a roller track will be further transported by the belt.

Obviously, the V-belts 21, 21′ carried by pulleys 22, 22′ can be replaced by pulleys with rubber coverings or by chains with friction blocks.

Two slides 24 are provided at the outlet end 2 of the machine at the rear end of the tray staple S4. The slides 24 hang upon levers 26 which are swingably mounted upon shafts 25 carried by the machine casing. The levers 26 are intermittently swung by a leverage 27, 28 and an eccentric 29 actuated by a separate electromotor (not shown) in a manner which will be described in detail later on. The slides 24 carry rods 31 provided with hooks 30 which are used to pull forwardly the next empty pallet.

The described machine operates as follows:

At the inlet end of the machine trays F1 are raised from the stack S1 upon the pallet P1, they are guided through all the stations of the machine and are placed at F8 upon the stack S4 carried by the pallet P2. As soon as the last tray is lifted beyond the uppermost end of the rod 14, the rod 14 will drop down slightly and, by means of the limit switch 16, will switch on the electric motor for driving the two wormwheels 20 which stop again after having executed half a revolution in the direction of the arrow. The two rods 18 then grip behind the stack S2 and push it into the previous position of the stack S1 (see FIG. 3), the pallet together with the stack S3 rolling onwards accordingly on the roller track 4, 5 while the rod 14 is again slightly lifted and pushed outwardly and the limit switch 16 is opened. After the stack S2 is completely lifted off, the tray stack S3 is moved in the same manner into the lifting-off position. The distance between the front edge of the pallet P1 and the V-belt 21 will be very small.

Before the tray stack S3 disposed in place of the stack S1 (FIGS. 1 and 3) is completely lifted off, the next pallet with three tray stacks is pushed upon the roller track until it touches the pallet P1, its front stack being then in the position of the stack S3 shown in the drawing. The empty pallet P1 is pushed with its front end onto the V-belts 21 when the first tray stack of the succeeding pallet is pushed into the lifting-off position, as described. As soon as the stack S4 on the pallet P2 at the exit end 2 of the machine has reached its specified height with the last tray F8, a limit switch (not shown) appropriately actuated by a gripper on the roller chains 13, will switch on the motor for driving the eccentrics 29. The eccentrics execute a full revolution and push the stack S4 together with the pallet P2 forward on the roller track 4', 5' by one stack pitch T via the rails 24, levers 26 and linkage 27, 28. This procedure is repeated after each successive stack of trays has been filled.

Figure 5:
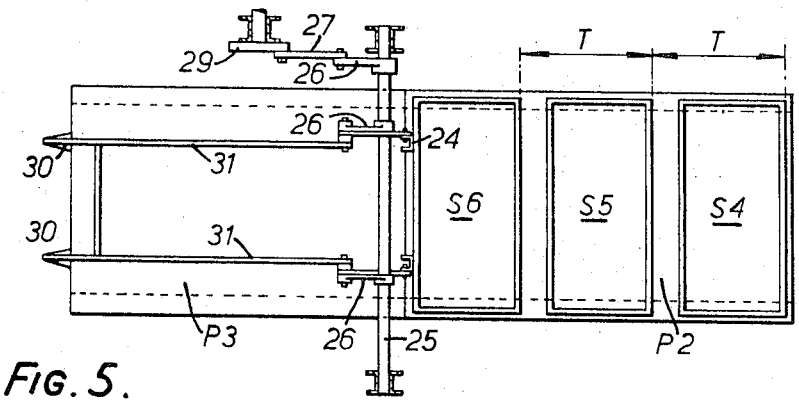
FIGURE 5 is a detail plan view of the portion of the device which is used to automatically push forward a filled stack of trays.

When the pallet P2 has reached the position for receiving the last stack of trays S6 (FIG. 5) a limit switch (not shown) switches on the motor driving the V-belts 21 which move one or more pallets bearing on the V-belts, towards the exit end of the machine until the front pallet P3, after moving below the hooks 30 previously lifted by the pallet, has reached the rods 31. When the pallet P2 is subsequently moved forward after the last stack S6 is completely filled on the aforementioned pallet, the pallet P3 is carried into the correct position for receiving the next stack of filled forms or trays. As soon as the last stack of trays S6 is filled and is automatically pushed out of the exit end of the machine, the pallet P2 will move over the V-belts 21' whose motor is automatically switched on and the full pallet is moved onto the roller track 4', 5' after which the V-belts 21 once again stop.

The invention is not confined to the embodiment example described in conjunction with the mogul molding machine. The tray stack and pallet conveying system disclosed by the invention can be applied to any kind of machine for the casting of confectionery with any type of molds which are obtained at the inlet end of the machine from a mold stack and are re-assembled into a mold stack at the exit end of the machine.

What is claimed is:
1. In a machine for casing confectionery in trays, said machine having an inlet end and an outlet end located opposite said inlet end, in combination, tray supporting means comprising a roller track extending in the longitudinal direction of the machine and located at the inlet end thereof, and a pallet movable upon said track and adapted to carry a plurality of stacks of trays, said stacks extending side by side in the longitudinal direction of the machine; means removing the trays one by one from one of said stacks while located on the pallet, emptying the trays, refilling them and moving them to the outlet end of the machine, conveying means periodically engaging said supporting means after said one stack has been emptied for moving said pallet to place another stack into the position previously occupied by the emptied stack, additional tray supporting means comprising another roller track extending in the longitudinal direction of the machine and located at the outlet end thereof and another pallet movable upon said other track and adapted to receive trays from said tray removing means; means for conveying empty pallets from the inlet end of the machine to the outlet end thereof and additional conveying means periodically engaging said additional tray supporting means after one stack of trays has been formed upon said other pallet and shifting said other pallet by a distance corresponding to the length of a stack, said additional conveying means being operatively connected with the means for moving empty pallets.

2. A container supplying mechanism as described in claim 1, the conveying means provided to move said supporting means so as to present an additional stack of containers into operative relationship at the inlet end of the machine, comprising two diametrically disposed pairs of rods, said rods extending downwardly and adjacent to said supporting means, said rods being respectively counter rotatable, a vertical shaft about which said rods rotate through a distance of 180°, said mechanism being designed so that in the static position one rod of said pair of rods is disposed behind the stack positioned by said rod into operative relationship.

3. A mechanism as described in claim 2, wherein the additional conveying means provided produce an additional position for stacking an additional plurality of containers at the outlet end of said machine, comprising two slides disposed behind stack containers upon said supporting means, a plurality of levers, a linage operatively connected to said levers, an eccentric connected to said linkage, said levers actuating said slides.

4. A mechanism as described in claim 3, wherein the means for conveying pallets from the inlet end of said machine to the outlet end of said machine comprise a pair of belts, a plurality of pulleys actuating said belts and a plurality of shafts actuating said pulleys, a pair of roller tracks for carrying said supporting means, and means for automatically actuating said shafts at the proper time so as to move said supporting means.

5. A mechanism as described in claim 4, wherein friction linings are mounted upon said pulleys.

6. A device as described in claim 5, wherein said pulleys are coupled to said shafts by means of a free wheeling device.

References Cited

UNITED STATES PATENTS

| | | | |
|---|---|---|---|
| 3,151,753 | 10/1964 | Verrinder et al. | 214—6 |
| 2,028,410 | 1/1936 | Rapisarda | 214—6 X |
| 2,161,836 | 6/1939 | Stevenson | 214—306 X |
| 2,572,650 | 10/1951 | Molins | 214—38 X |
| 2,830,715 | 4/1958 | Oholm | 214—6 X |
| 3,181,712 | 5/1965 | Von Gal | 214—8.5 X |
| 3,190,467 | 6/1965 | English | 104—163 X |

GERALD M. FORLENZA, *Primary Examiner.*

R. J. SPAR, *Assistant Examiner.*

U.S. Cl. X.R.

214—6, 8.5